United States Patent [19]

Hicks, Jr.

[11] Patent Number: 4,618,258

[45] Date of Patent: Oct. 21, 1986

[54] METHOD FOR MEASURING LOOP COUPLING EFFICIENCY

[75] Inventor: John W. Hicks, Jr., Northboro, Mass.

[73] Assignee: Polaroid Corporation, Cambridge, Mass.

[21] Appl. No.: 637,478

[22] Filed: Aug. 3, 1984

[51] Int. Cl.$^4$ ............................................. G01N 21/84
[52] U.S. Cl. .................................... 356/73.1; 350/96.15
[58] Field of Search ...................... 356/73.1; 350/96.15

[56] References Cited

U.S. PATENT DOCUMENTS

| | | | |
|---|---|---|---|
| 3,867,033 | 2/1975 | Hasinger | 356/103 |
| 3,928,102 | 12/1975 | Rowe et al. | 156/158 |
| 3,936,142 | 2/1976 | Kersten | 350/96 C |
| 4,121,884 | 10/1978 | Greenwood | 350/96.15 |
| 4,136,929 | 1/1979 | Suzaki | 350/96.15 |
| 4,211,469 | 7/1980 | Holzman | 350/96.16 |
| 4,270,049 | 5/1981 | Tanaka et al. | 250/227 |
| 4,387,954 | 6/1983 | Beasley | 350/96.15 |
| 4,536,058 | 8/1985 | Shaw et al. | 350/96.15 X |

*Primary Examiner*—Vincent P. McGraw
*Attorney, Agent, or Firm*—David R. Thornton

[57] ABSTRACT

A method for determining optical transmission characteristics and efficiencies in multi-path optical fiber networks which include, for example, inter-fiber couplings and optical components, includes introducing light energy into the entry port of the network, measuring the light energy at the network exit port or ports, exposing a portion of the light energy transmitting core in one of the optical paths of the network by, for example, removing the cladding from core, surrounding the exposed core with a material, such as a liquid, having an index of refraction greater than that of the exposed core to cause the light energy to escape and thereby quench light transmission, and remeasuring the light energy at the network exit ports. The change in energy transmission before and after light quenching is a measure of transfer characteristics of the selected optical path and related couplings.

10 Claims, 5 Drawing Figures

METHOD FOR MEASURING LOOP COUPLING EFFICIENCY

BACKGROUND OF THE INVENTION

The present invention relates to optical fibers. More particularly, it relates to a method for determining the light energy transmission characteristics and efficiencies of coupled optical fibers.

In coupling fibers to one another and to various types of optical components to form optical fiber networks, it is often times desirable to measure the light transmission efficiency or other transfer characteristics of a particular optical path, coupling, or component. While it is a relatively straight forward matter to measure light energy transmission through an in-line optical fiber, coupling, or component, the problem is made more difficult when attempting to measure coupling efficiencies in a network where the light energy present at any one exit port can represent light from several different optical paths in the network. For example, it is difficult to measure the transfer characteristics of a single optical fiber that is looped upon and laterally coupled to itself to form an in-line resonant loop. The light at the exit port represents both light transmitted through the lateral coupling and through the resonant loop.

The need for reliable methods for determining light energy transfer efficiencies is particularly important in multi-channel, wavelength multiplexed communications systems where a large number of wavelength unique information-bearing signals are present on a primary trunk line and where signals of one or more wavelengths are removed using wavelength tuned optical components. Accordingly, a need exists for measuring light energy transfer characteristics in various types of networks which method is reliable and can be accomplished with minimum disruption of the network operation.

SUMMARY OF THE INVENTION

In accordance with the present invention, a method for measuring the light energy transfer characteristics and efficiencies of optical fiber couplings and components is provided. In the practice of the method for measuring the light energy transfer characteristics, for example, of an in-line laterally coupled optical fiber resonant loop, the light energy output at an exit port is determined relative to the light energy at the entry port. A portion of the core cladding on one of the optical paths is at least partially removed and the then thinly clad core coated with a material, such as a liquid or other substance, having an index of refraction greater than that of the core to supress or quench the total internal reflection within that path by causing the light energy in the core to escape. The light output at the exit port is then remeasured and now represents only the light that is transferred through the unquenched optical path.

A principal objective of the present invention is, therefore, the provision of an improved method for measuring optical energy transfer characteristics of coupled optical fibers and components, particularly, in multi-path network environments. Other objects and further scope of applicability of the present invention will become apparent from the detailed description to follow, taken in conjunction with the accompany drawings, in which like parts are designated by like reference characters.

DESCRIPTION OF THE PREFERRED EMBODIMENT

Figure 1:
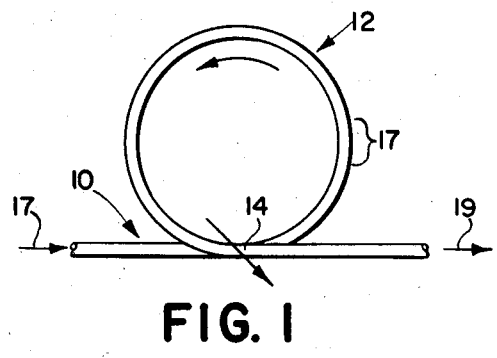
FIG. 1 illustrates a single-mode optical fiber having an in-line resonant loop formed intermediate its ends.
Figure 2:
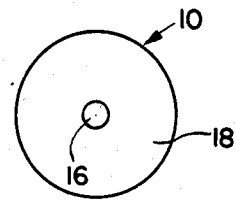
FIG. 2 is an end view of an optical fiber illustrating its core and surrounding cladding layer.

The present invention is well suited for determining light energy transfer characteristics and efficiencies in optical fiber loops where light energy introduced into an entry port is divided among several optical paths and provided to one or more exit ports, one such multi-path optical system being illustrated in FIG. 1. As shown therein, an optical fiber 10 has a loop 12 formed intermediate its ends with those portions of the optical fiber that define the loop termination zones laterally coupled to one another in the region 14. The optical path length of the loop 12 is controlled to resonate at a conventional type and includes, as shown in FIG. 2, a light energy transmitting core 16 and a cladding layer 18 having an index of refraction less than that of the core. Techniques for achieving lateral coupling of optical fibers including wavelength selective optical couplings are disclosed in U.S. Pat. No. 4,315,666 entitled "Coupled Communications Fibers" and in U.S. Pat. No. 4,342,499 entitled "Communication Tuning Construction". The disclosure of both of these patents is incorporated herein to the extent necessary to practice the present invention.

Where broadband light energy is transmitted in the structure of FIG. 1 from an entry port 17 to an exit port 19, as indicated by the directional arrows, the light appearing at the exit port is a composite of the light from the entry port that travels around the resonant loop 12 to the exit port and the light passing through the laterally coupled region 14 to the exit port. In addition, light energy present in the resonant loop 12 that corresponds to the resonant frequency of the loop will resonate within the loop and, depending upon the optical impedance of the loop, will be attenuated in the exit port 19 energy spectra.

As can be appreciated from the above, since the lateral coupling region 14 couples the input port to the output port and also defines the resonant loop 12 closure zone, it is difficult to quantitatively determine which portion of the light energy passing from the entry port 17 to the exit port 19 passes through the lateral coupling region 14 and which portion passes from the entrance to the exit port through the resonant loop 12.

Figure 3:
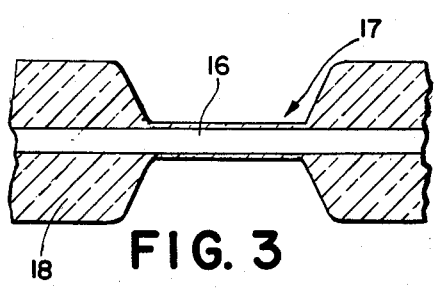
FIG. 3 is a detailed view of a portion of an optical fiber having a portion of its cladding removed.
Figure 4:
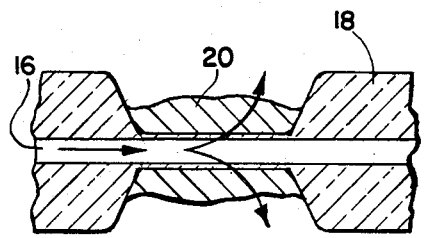
FIG. 4 is a detailed view, similar to that of FIG. 3, showing the optical fiber core coated with a fluid material to suppress light transmission in the core.

In accordance with the present invention, the light energy transfer through the lateral coupling region 14 and the resonant loop 12 can be quantified by first reducing the cladding at one point in the loop as shown in FIG. 3 to at least almost expose the core 16 at that point with a little cladding preferably remaining (e.g., a thickness equal to one-half to one core diameter) so as to preclude core damage and contamination. This exposure (or near exposure of the core 16 can be accomplished, for example, by fabricating an optical fiber having a cladding 18 whose outer layers at least can be preferentially etched with chemical etchants to effect partial removal of such outer layers. For example, the fiber is drawn from a preform constructed with a doped core rod and thin cladding layer of fused silica, both relatively resistant to etching, with a complete cladding layer of more etchable glass.

Once a portion of the cladding 18 is reduced to at least almost expose the core, a material 20 having an index of refraction higher than that of the core 16 is deposited into the small gap defined by the removed cladding. The quantity of material 20 deposited into the gap must be sufficient to surround the core 16. Preferred materials 20 include liquid oils, including silicone and hydrocarbon oils, that can be readily applied to the now thinly clad core 16 and which are designed to have an index of refraction higher than that of the core. Typical indices of refraction for the applied material 20 are those greater than 1.5. Since the applied material 20 has an index of refraction greater than that of the core 16, the core/cladding boundary conditions are changed from one which supports internal reflection to one which supports transmission of the light energy through the boundary. Accordingly, the light energy in the core 16 will be allowed to escape to suppress or quench further light energy transmission through the core. The axial length of the reduced cladding is not critical, although a sufficient length of fiber should be undercut to allow for substantially complete extinction of the light when the material 20 is applied.

Measurement of the light energy at the exit port 19 at various wavelengths before and after light quenching provides a direct quantitative measurement of the light transmitted through the lateral coupling region 14 and, conversely, the optical impedance of resonant loop 12.

Figure 5:
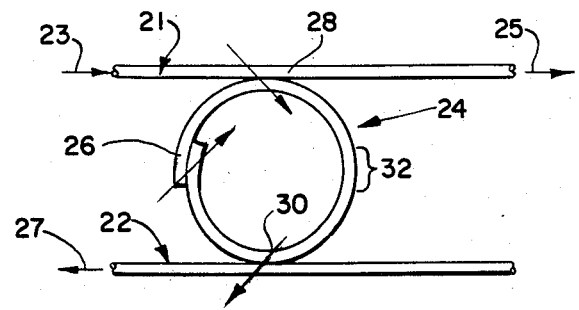
FIG. 5 illustrates first and second optical fibers coupled by an inter-fiber resonant loop.

The method illustrated in connection with FIGS. 1–4 above in which the optical network has one entry port and one exit port can be utilized in multi-path tapped or branched configurations as illustrated in FIG. 5.

As shown in FIG. 5, a first optical fiber 21 is coupled to a second branch optical fiber 22 by an interfiber resonant loop 24 formed from a length of optical fiber laterally coupled in a loop termination region 26. Light energy introduced into an entry port 23 will pass directly through the fiber 21 to a first exit port 25 and through the interfiber loop 24 and the branch optical fiber 22 to a second exit port 27. The optical path length of the resonant loop 24 is selected to provide resonant characteristics at a selected wavelength. The resonant loop 24 is laterally coupled to the optical fiber 21 in region 28 and to the optical fiber 22 in region 30. Light energy transmitted through the optical fiber 21 having a wavelength at or near the resonant characteristic of the resonant loop 24 will cause resonance within the loop. The light energy within the loop 24 will then be transferred to the second optical fiber 22 through the lateral coupling region 30. The optical efficiency of the lateral couplings 28 and 30 between the optical fiber 21 and the optical fiber 22 can be determined by reducing the cladding along portion of the optical fiber that defines loop 24, for example in area 32. After the cladding is reduced, a liquid or similar material having an index of refraction greater than that of the core, as described above, is applied to quench light transmission. Accordingly, the change in light energy at the exit ports 25 and 27 is a measure of the light transmission transfer characteristics of the loop coupling 26 and the fiber-to-loop lateral couplings 28 and 30 and, conversely, the resonant characteristics of the resonant loop 24.

Thus, it will be appreciated from the above that as a result of the present invention, a highly effective method for determining optical energy transfer characteristics and efficiencies in optical fiber loops and networks is provided by which the principal objective, among others, is completely fulfilled. It will be equally apparent and is contemplated that modification and/or changes may be made in the illustrated embodiment without departure from the invention. Accordingly, it is expressly intended that the foregoing description and accompanying drawings are illustrative of preferred embodiments only, not limiting, and that the true spirit and scope of the present invention will be determined by reference to the appended claims and their legal equivalent.

What is claimed is:

1. A method for determining the light energy transfer characteristic of a selected optical path in a multipath optical fiber network in which the optical fibers include a light energy transmitting core and a cladding having an index of refraction less than that of the core, the network including an exit port and at least a pair of fibers coupled together such that light energy is fed from both said fibers to the exit port, said method comprising the steps of:
   determining the characteristics of the light energy output at the exit port;
   interrupting the transmission of light energy in the core of one of the selected optical fibers by effecting a change in the boundary conditions at least adjoining the core to cladding interface of one fiber sufficient to cause the light energy in the core to escape the core; and
   redetermining the characteristics of the light energy output at the exit port and comparing the redetermined characteristics with the first-determined characteristics.

2. The method of claim 1, wherein said interrupting step comprises:
   removing at least a portion of the cladding from the fiber along a length in the selected optical path to provide an exposed or thinly clad axial length of the core; and
   surrounding said axial length with a material having an index of refraction greater than that of the core to suppress light transmission in the selected optical path.

3. The method of claim 2, wherein said removing and surrounding steps further comprise:
   at least reducing the cladding along a sufficient axial length of the core to effect substantially complete interruption of light transmission in the core when the axial length of reduced cladding is surrounded with said material.

4. The method of claim 2, wherein said surrounding step comprises:
   surrounding said axial length of the core with a fluid material having an index of refraction greater than that of the core.

5. A method of determining the light energy transfer characteristics of a loop in an optical fiber network defined by an optical fiber path having an in-line loop with the optical fiber coupled to itself to define the loop, the optical fiber having a light energy transmitting core surrounded by a cladding material having an index of refraction less than that of the core, the method comprising the steps of:
introducing light energy into an entry port of the optical fiber path for transmission through the loop to an exit port of the optical fiber path;
determining the characteristics of the light energy at the exit port;
interrupting the transmission of light energy in the core of the optical fiber defining the loop by effecting a change in the boundary conditions at the core to cladding interface of the fiber defining the loop to cause the light energy in the core to escape the core; and
redetermining the characteristics of the light energy at the exit port and comparing the redetermined characteristics with the first-determined characteristics.

6. The method of claim 5, wherein said interrupting step comprises:
removing at least a portion of the cladding from a length of the fiber in the loop to provide at least a thinly clad area of the core; and
surrounding the said length with a material having an index of refraction greater than that of the core to suppress light transmission in the loop.

7. The method of claim 6, wherein said removing and surrounding steps further comprise:
removing the cladding from a sufficient axial length of the core to effect substantially complete interruption of light transmission in the core when said length is surrounded with said material.

8. The method of claim 6, wherein said surrounding step comprises:
surrounding said length with a fluid material having an index of refraction greater than that of the core.

9. A method for determining the light transfer characteristics of an optical fiber transmission line coupled to a light energy modifying component defined by a segment of optical fiber the transmission line having an exit port downstream of the coupling of the fiber segment to the line such that light energy is fed from both the transmission line and the segment to the exit port, the method comprising the steps of:
determining the characteristics of the light energy at the exit port of the transmission line;
interrupting the transmission of light energy in the core of the optical fiber segment defining the light energy modifying component by effecting a change in the boundary conditions at the core to cladding interface of the fiber segment to cause the light energy in the core to escape the core; and
redetermining the characteristics of the light energy at the exit port and comparing the redetermined characteristics with the first-determined characteristics.

10. The method of claim 9, wherein said interrupting step comprises:
removing a portion of the cladding from the fiber in the optical fiber segment to provide an exposed or thinly clad axial length of the core; and
surrounding said axial length of the core with a material having an index of refraction greater than that of the core to suppress light transmission in the light energy modifying component.

* * * * *